(12) United States Patent
Eisenmann et al.

(10) Patent No.: US 6,335,684 B1
(45) Date of Patent: Jan. 1, 2002

(54) METHOD FOR CAPACITATIVE OBJECT RECOGNITION IN MOTOR VEHICLES

(75) Inventors: Lutz Eisenmann, Vierkirchen; Robert Griessbach, Weyarn; Yan Lu, Freising; Christian Marschner, Munich, all of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/646,957

(22) PCT Filed: Feb. 20, 1999

(86) PCT No.: PCT/EP99/01115

§ 371 Date: Sep. 25, 2000

§ 102(e) Date: Sep. 25, 2000

(87) PCT Pub. No.: WO99/48727

PCT Pub. Date: Sep. 30, 1999

(30) Foreign Application Priority Data

Mar. 23, 1998 (DE) .......................................... 198 12 626

(51) Int. Cl.⁷ ............................................. G08B 13/26
(52) U.S. Cl. ................. 340/562; 340/870.37; 73/290 R
(58) Field of Search ........................... 340/562, 870.37, 340/426, 541, 540; 73/290 R, 304 C; 180/271, 272

(56) References Cited

U.S. PATENT DOCUMENTS

| 4,796,013 A | * | 1/1989 | Yasuda et al. ............... 340/562 |
| 5,442,347 A | * | 8/1995 | Vranish ................... 340/870.37 |
| 5,832,772 A | * | 11/1998 | McEwan ................... 73/290 R |
| 6,075,294 A | * | 6/2000 | Van den Boom et al. . 307/10.1 |
| RE36,772 E | * | 7/2000 | Vranish et al. ........ 340/870.37 |

* cited by examiner

Primary Examiner—John Tweel
(74) Attorney, Agent, or Firm—Crowell & Moring LLP

(57) ABSTRACT

A capacitive object detection system for a vehicle has first and second capacitive electrodes embedded in the vehicle seat. The two electrodes are excited by oppositely phased alternating voltages, which are adjusted by a controller such that the resulting alternating currents in their respective feed lines are substantially equal and oppositely phased. The presence, size and location of an adjacent object is then determined based on an analysis of the impedances of the first and second electrodes.

15 Claims, 3 Drawing Sheets

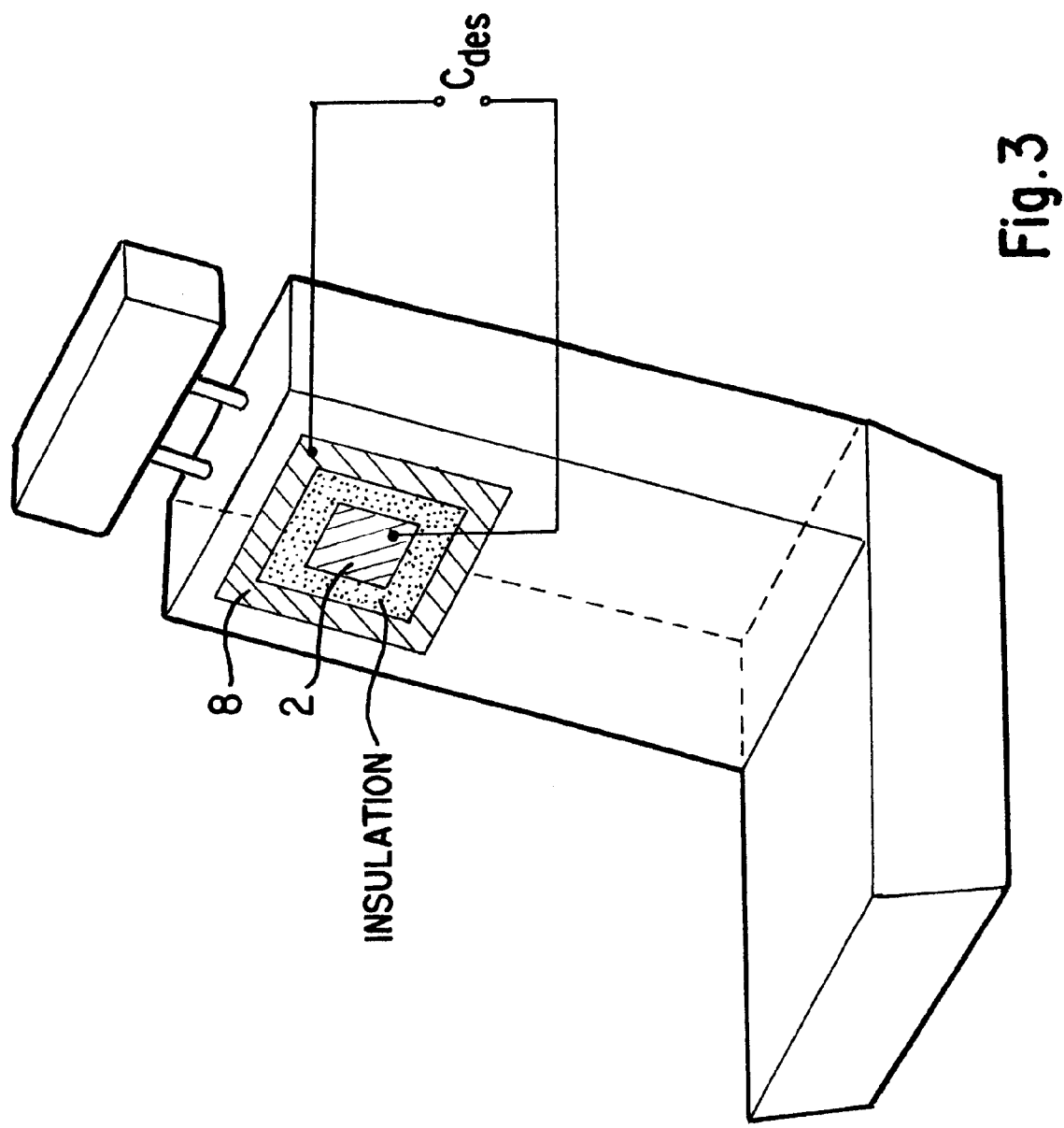

METHOD FOR CAPACITATIVE OBJECT RECOGNITION IN MOTOR VEHICLES

BACKGROUND AND SUMMARY OF THE INVENTION

This application claims the priority of PCT International Application No. PCT/EP99/01115, filed Feb. 20, 1999 and German patent document 198 12 626.3, filed Mar. 23, 1998, the disclosures of which are expressly incorporated by reference herein.

The invention relates to a method and apparatus using a capacitive detection technique for detecting objects in a vehicle.

Methods of this generic type are known from various publications, such as U.S. Pat. No. 4,796,013. In principle, two usually plate-shaped electrodes are arranged adjacent to a place where the presence of an object is to be detected. For detecting whether a vehicle seat is occupied, the electrodes are situated in the cushioning of the seat and there, for example, in the seat part or backrest part. In this case, the detection is used for triggering safety devices, such as an air bag or the like only if the seat is actually occupied.

The capacity of the capacitor which is thus formed is measured. If a person is present, the capacity of the capacitor will change because of the person's relatively good conductivity. However, a problem which occurs when this technique is used is that the known methods relate to the vehicle mass. As a result of ohmic or capacitive leakage currents, the capacity measurement is severely falsified.

It was found in practical tests that the effect of leakage currents, as a rule, outweighs by far the effect of the capacity change. The situation becomes more difficult because the leakage currents are considerably dependent on environmental parameters, such as humidity or the person's contact with another vehicle occupant. Thus, two oppositely acting effects occur, so that of the leakage current cannot be quantitatively detected. This means that information can hardly be supplied concerning the mass or the volume of the object situated on the seat, thus, for example, the detection of a child seat.

One method of solving these problems is disclosed in International Patent Document WO 95/21752 (corresponds to U.S. Pat. No. 5,525,843), in which the two electrodes are insulated with respect to the vehicle mass. However, complete insulation cannot be achieved because, at least a capacitive coupling always exists between the measuring arrangement containing the two electrodes and the vehicle mass. As a result, fault currents also cannot be completely prevented. In addition, the no-potential construction of such a measuring arrangement requires high expenditures.

One object of the invention is to provide a method and apparatus of the initially mentioned type, which supplies precise information concerning the presence of an object, with low equipment-related expenditures.

This and other objects and advantages are achieved by the method and apparatus according to the invention, in which two electrodes are operated by means of antiphase alternating voltages. The two electrode currents compensate one another. As a result, the object is at least approximately at the mass potential, without the requirement of insulation for this purpose. Leakage currents occur, if at all, only to a minor extent. As a result, the method is not influenced or at least not significantly influenced specifically by the initially described problem.

In one embodiment of the invention, the total stressing of the object is reduced to zero, and leakage currents are completely excluded. Based on the adjustment of the sum of the two condenser currents to zero in the absence of an object, the sum is adjusted to zero also in the presence of the object.

Another embodiment of the invention also permits detection of the size of an object.

In addition (or as an alternative), it is also possible to detect the position of the object with respect to the two electrodes, as well as a change of position (and thus whether the object is out of position). From the information obtained from the size and the position of the object, it is also possible to detect the existence of a child seat and also its arrangement in the driving direction or against the driving direction. Thus, it becomes possible to correspondingly control, for example, safety devices, such as an air bag, or to block its triggering.

Also, according to another feature of the invention, it is possible to improve the directive effect, so that objects on the "other" side of the electrode(s) will then not influence the result. Finally, a diagnostic capability can also be provided, virtually continuously.

Other objects, advantages and novel features of the present invention will become apparent from the following detailed description of the invention when considered in conjunction with the accompanying drawings.

BRIEF DESCRIPTION OF THE DRAWINGS

FIG. 3 is a view of a diagnostic possibility for the method according to the invention.

DETAILED DESCRIPTION OF THE DRAWINGS

Figure 1:
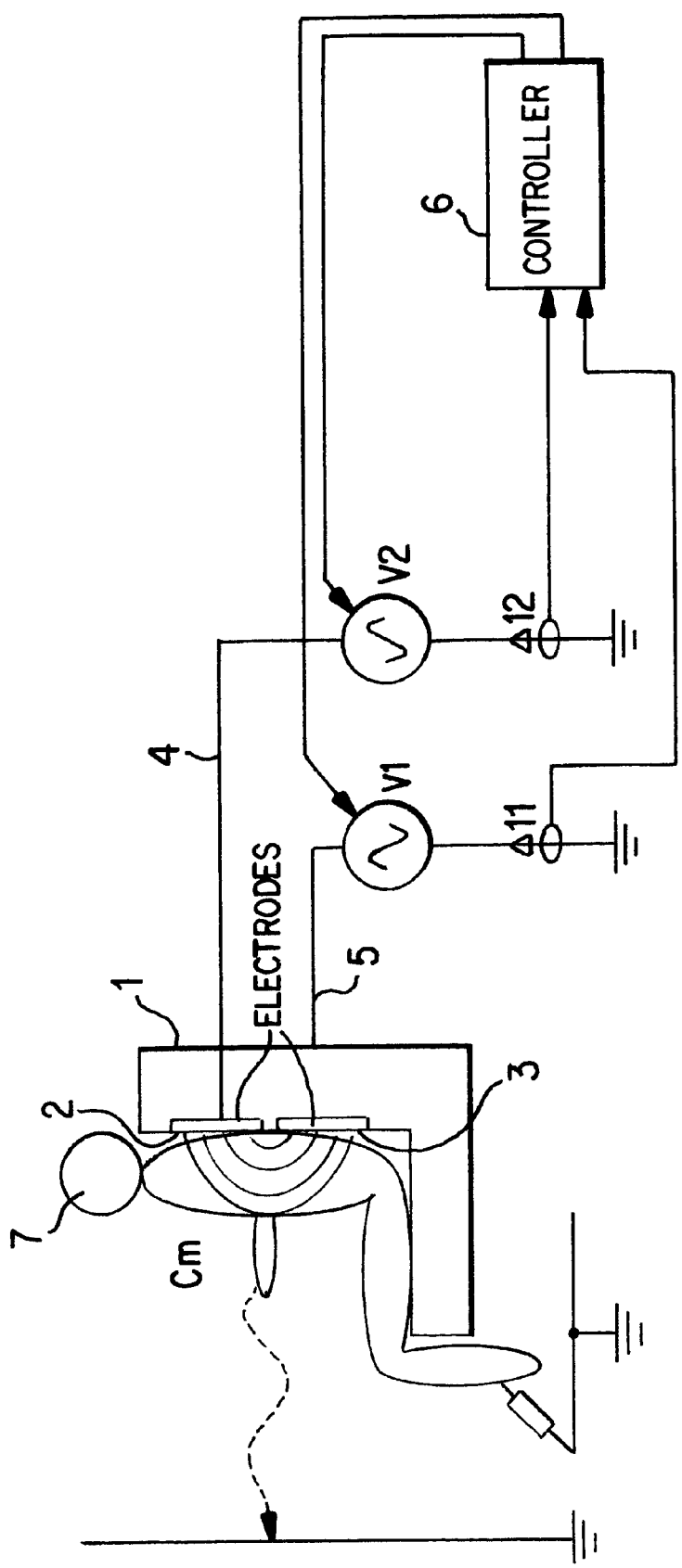
FIG. 1 is a view of a first arrangement for implementing the method according to the invention.

FIG. 1 is a schematic view of a switching arrangement for implementing the invention. Electrodes 2 and 3 are situated in a (schematically illustrated) vehicle seat 1 and are excited by oppositely phased alternating voltages $V_1$ and $V_2$. The alternating currents $I_1$ and $I_2$ occurring in the feed lines 4 and 5 are detected and the detected values are supplied to a regulator 6, which controls the two alternating currents $I_1$ and $I_2$ to an oppositely equally large value. The cumulative current $(I_1+I_2)$ is therefore equal to zero. In practice, a current value of 3 mA at an alternating voltage frequency of between 10 and 150 kHz, preferably 50 kHz, was found to be expedient.

As a result, according to Kirchhoff's law, the measured object to be detected here, as schematically shown—also has mass potential. Leakage currents, which may occur, for example, when the object (person) touches a vehicle object connected with the vehicle mass, are therefore eliminated.

The ratio of the two a.c. impedances $V_1/I_1$ and $V_2/I_2$ supplies information on the position of the measured object; and the sum of these two impedances permits a conclusion with respect to the size of the measured object. In general, the a.c. impedance will be the smaller, the closer the object is to the electrode and the larger it is. As a result, precise information is obtained concerning the presence, size and position of the measured object; and electric stressing of the measured object is simultaneously avoided.

Figure 2:
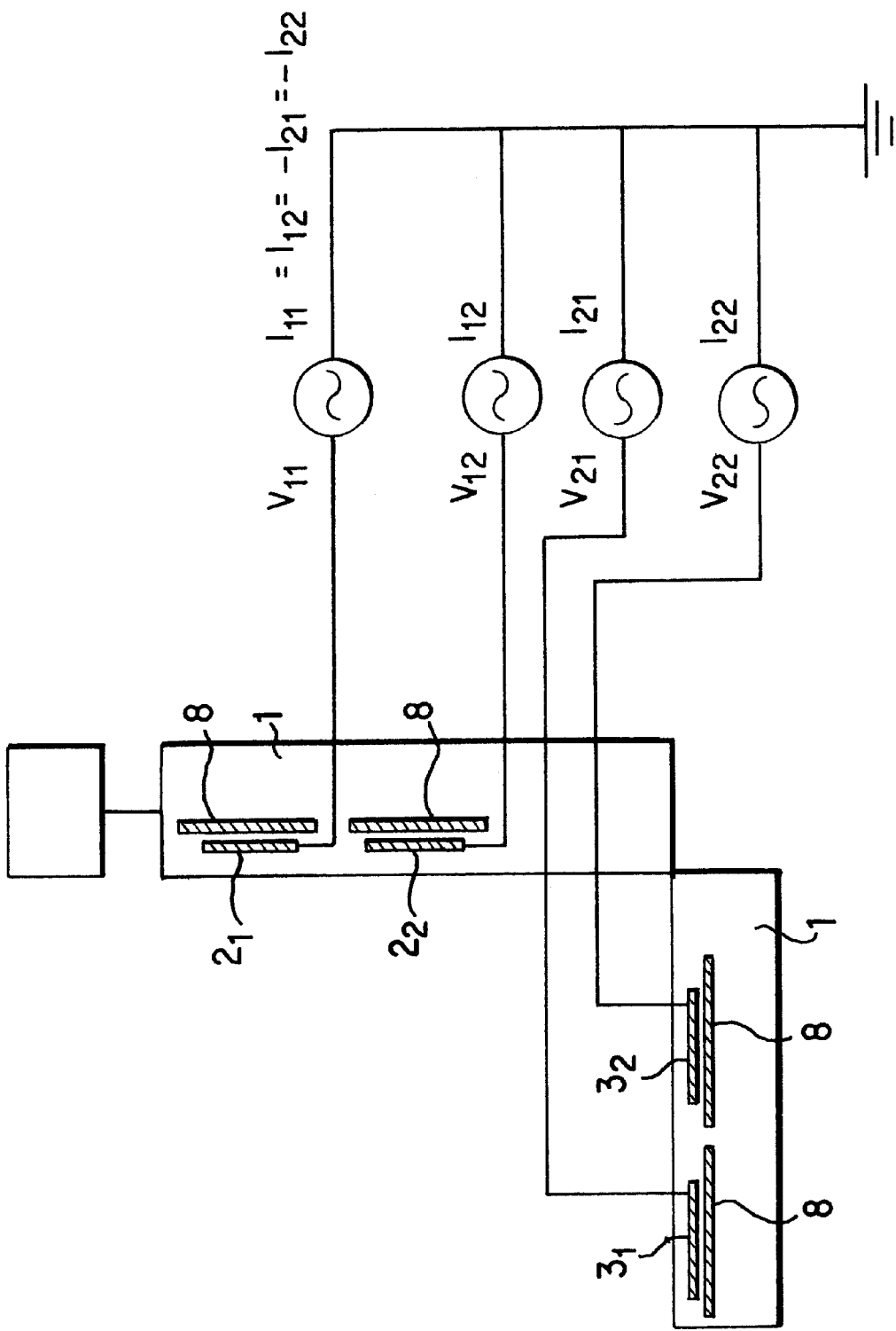
FIG. 2 is a view of a second arrangement for implementing the method according to the invention with an improved position detection of an object.

In the embodiment according to FIG. 2, each electrode 2 and 3 consists of two partial electrodes $2_1$ and $2_2$ as well as $3_1$ and $3_2$. In addition, a shield in the form of an electrically conductive plate 8 is assigned to each partial electrode, by means of which a directive effect is achieved toward the measured object (compare U.S. Pat. No. 5,166,679).

The in-phase alternating voltages $V_{11}$, $V_{12}$ and the oppositely phased a.c. $V_{21}$ and $V_{22}$ are adjusted such that the currents $I_{11}$ and $I_{12}$, on the one hand, and the currents $I_{21}$ and $I_{22}$, on the other hand, are in each case identical in their amounts and opposed to one another in pairs, with and without a present measured object. The changes of the respective a.c. impedances, both absolutely and relative to one another, permit clear conclusions with respect to the size, actual position and extent of object. As a result, safety devices (not shown) can be activated according to the requirements.

Finally, FIG. 3 shows an arrangement for diagnosis of the system. In this case, each of the partial systems illustrated in FIG. 2 having a partial electrode $2_1$, $2_2$, $3_1$ or $3_2$, a plate 8 and an alternating voltage source $V_{11\text{-}22}$ is wired as illustrated. For diagnostic purposes, the capacity $C_{desired}$ is determined between the partial electrode and the plate 8 insulated with respect to the partial electrode. If this capacity corresponds to a desired value, the partial system is operating properly. This diagnosis is carried out individually for each partial system and alternately with the described object detection. The diagnosis of the partial systems takes place cyclically.

As a result of the functional connection of the measuring operation and the diagnosis, a reliable system is available for detecting an object.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for capacitive detection of an object in a vehicle having first and second condenser electrodes that are excited by an alternating voltage, the presence of an object being detected by a change of the total capacity of a condenser, said method comprising:

exciting the first and second electrodes with separate oppositely phased alternating voltages, whereby alternating currents in feed lines of the two electrodes are added up; and detecting at least one of presence, size and position of an object adjacent said electrodes based upon determined impedance of said first and second electrodes.

2. The method according to claim 1, wherein in the presence of an object, amplitudes of the two alternating voltages are adjusted such that the sum of the two alternating currents is approximately equal to zero.

3. The method according to claim 1, wherein the size of the object is determined by the summation of the impedances of the first and second electrodes.

4. The method according to claim 1, wherein the position of the object is determined from a ratio of the impedances of the first and second electrodes.

5. Method according to claim 1, wherein each of said first and second electrodes comprises two partial electrodes which are excited by in-phase alternating voltage by way of separate feed lines.

6. The method according to claim 1, wherein an electric interaction of the electrodes toward a side facing away from the object is prevented by an electric shield.

7. The method according to claim 6, wherein said electric shield comprises a parallel, electrically conductive plate for each electrode.

8. The method according to claim 6, wherein for the diagnosis of subsystems consisting of the electrode, the shield and the pertaining feed lines, capacitance between the electrode and the shield is determined.

9. The method according to claim 8, wherein diagnosis is carried out alternately with the detection of the object.

10. Apparatus for detecting an object in an automobile, comprising:

first and second electrodes embedded in a surface of said automobile adjacent a location where an object is to be detected;

an alternating voltage source connected to supply oppositely phased first and second alternating voltages to said first and second electrodes, respectively; and a controller for adjusting said first and second alternating voltages such that a sum of alternating currents in feed lines of the first and second electrodes is substantially equal to zero;

wherein said controller determines at least one of presence, size and position of an object in said location, based on a determination of a.c. impedances of said first and second electrodes.

11. An apparatus according to claim 10, wherein said controller determines the size of the object based on a sum of said impedances.

12. An apparatus according to claim 10, wherein said controller determines the position of the object based on a ratio of said impedance.

13. An apparatus according to claim 10, wherein each of said first and second electrodes comprises two partial electrodes which are excited by in-phase alternating voltage by way of separate feed lines.

14. An apparatus according to claim 10, wherein each of said first and second electrodes has an electric shield which prevents interaction with a side facing away from said location.

15. An apparatus according to claim 14, wherein said electric shield comprises a parallel, electrically conductive plate for each electrode.

* * * * *